UNITED STATES PATENT OFFICE.

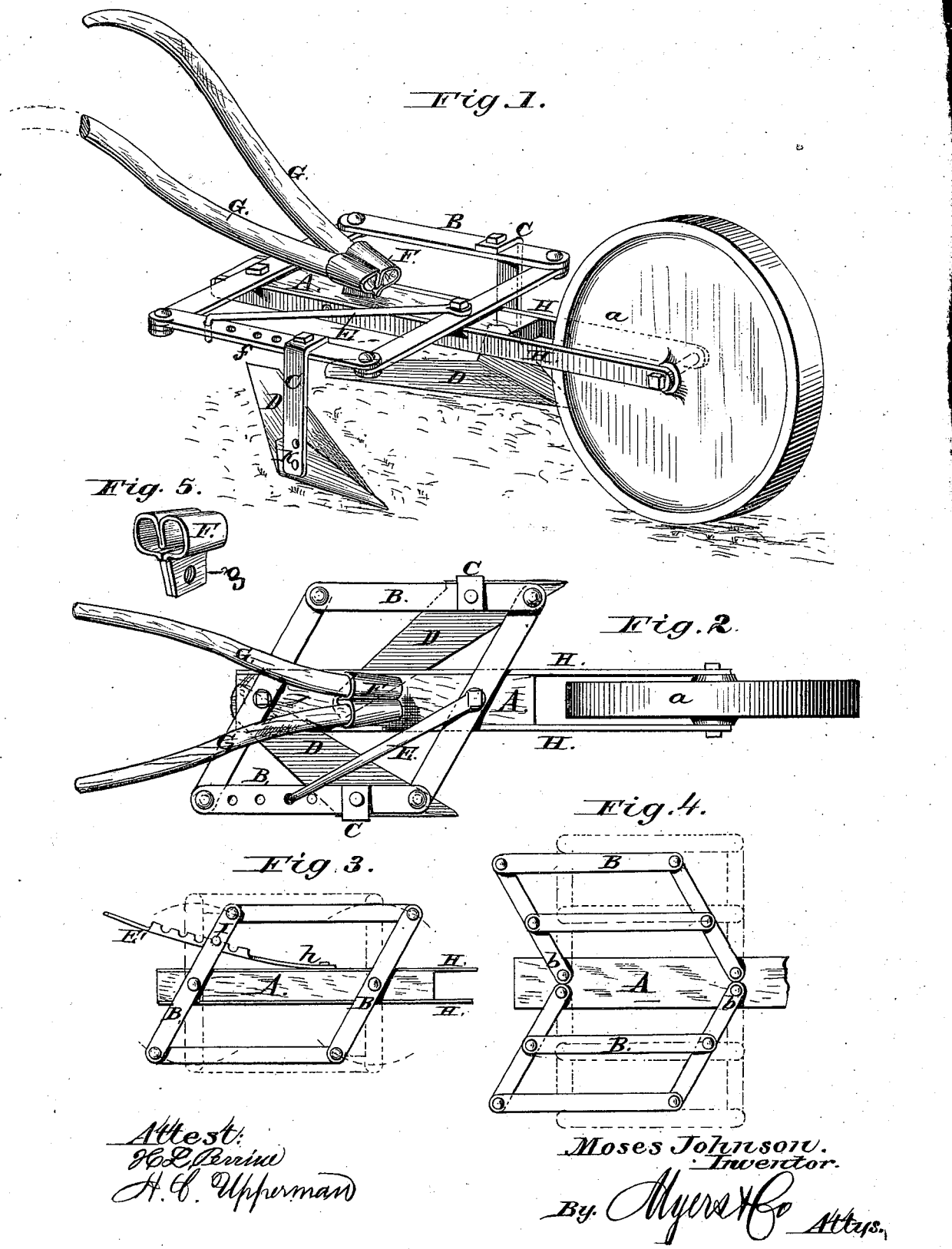

MOSES JOHNSON, OF LOCKPORT, NEW YORK, ASSIGNOR OF ONE-HALF HIS RIGHT TO MOSES CRANDALL RICHARDSON, OF SAME PLACE.

IMPROVEMENT IN GARDEN-WEEDERS.

Specification forming part of Letters Patent No. 197,731, dated December 4, 1877; application filed September 29, 1877.

*To all whom it may concern:*

Be it known that I, MOSES JOHNSON, of Lockport, in the county of Niagara and State of New York, have invented certain new and useful Improvements in Garden-Weeders; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a view of my device in perspective, excepting the spring-bar E, which is a modification of that feature of my device. Fig. 2 is a plan view of the same. Fig. 3 is a plan view of the frame of my device, showing the method of adjusting the same. Fig. 4 is a modification of the frame of my device.

My invention relates to the class of weeders or cultivators constructed with adjustable frames for carrying the knives, and to the method of adjusting the frame for regulating the width of the cutting, in connection with clutch E', Fig. 3.

A represents the beam, to which are bolted the longitudinal pieces H, for the reception of the broad-rimmed wheel $a$. To the beam A is also bolted the frame B, in such manner as to admit of its easy adjustment, and also rigidly attached thereto is the socket or handle-holder F.

B is an adjustable quadrangular frame for carrying the knives D. It is constructed of four pieces or bars, hinged together, as shown, and is connected by bolts to the beam A, the bolts also answering as pivots for the adjustment of the frame, the front and rear bars only being thus pivoted and bolted, respectively, by a single bolt at their center.

This construction of the frame admits of its being closed together, widened, or narrowed, while the side bars continue parallel and the angles of the knives unchanged when the cutting-space is varied; hence the knives are always a slight distance apart, and cannot be clogged.

It will be observed as a feature of this invention, comprised in the structure of the knives so relation to the frame, that the knives D are in arranged in relation to the beam A as to admit of their having a swinging motion or adjustment, whereby one of the knives may be thrown forward, and the other simultaneously rearward, when it is desirable to employ the device in the manner and form of a gang-plow.

To the side of beam A is longitudinally attached, at $h$, a piece of metal, comprising the spring and clutch E', which is provided on its upper side with a toothed flange, as shown, for the reception of the small vertically-projecting bar I. The spring E' presses against the vertical bar I, which latter is received by the tooth provided in the flange of the spring, and holds the frame rigidly, as the bar I is rigidly attached to the frame B.

A modification of the clutch is shown in Fig. 1, and consists of the pivoted spring-bar E in connection with the small apertures $f$ in the frame.

The spring-clutch E' not only provides the means of adjusting the knives D, so as to adapt them to the width of the intended work growing out of the unevenness and irregularities of the land, &c., but for employing the device as a gang-plow, as aforesaid.

A modification of the frame is shown in Fig. 4, where it is divided into two sections, each of which is adjustably attached to the beam by bolts, which have also the function of pivots, as aforementioned. Each section of said frame is provided with two adjustable transverse pieces, the parts being hinged together.

Each of the metallic standards C is bent to an elbow at their upper part, for bolting them to the frame, and to these standards are riveted the knives D at the lower part thereof.

The knives D are constructed to form vertical shoulders for attaching them to the standards C, and project obliquely toward the center of the frame, so as to cover all, or nearly all, of the space intermediate or between the standards of the frame.

The rear or exterior part of the blade of each of the knives is slightly elevated, the angle of elevation commencing from the edge of the blades, so as to cause said edges to decline at a slight angle toward the surface or work, the better to adapt them for the intended purpose.

The sockets F, for holding the handles G, may be formed, as shown, of folded sheet metal, with the flattened or vertically-projecting part thereof sunk into the beam, and rigidly secured in position by a bolt through the beam and orifice $g$; or they may be cast solid, with a flat plate at the lower part thereof, for fastening the sockets to the beam A, the said plate being provided with perforations for bolting or securing it to the beam. By this method of attaching the handles to the device, since they are not braced, as handles usually are, by a cross-bar, they may readily be removed to facilitate packing for shipment.

I claim—

1. The adjustable quadrangular frame B, pivoted to frame A, and provided with spring-clutch E', standards C, and knives D, projecting obliquely to embrace the space between the standards, all arranged to operate substantially as shown and described.

2. The frame B, pivoted to beam A, and provided with vertical bar I and spring-clutch E', substantially as shown, and for the purpose specified.

In testimony that I claim the foregoing as my own I hereunto affix my signature in presence of two witnesses.

MOSES JOHNSON.

Witnesses:
J. J. ARNOLD,
E. E. VAN HORN.